(12) United States Patent
Lund

(10) Patent No.: US 11,542,750 B2
(45) Date of Patent: Jan. 3, 2023

(54) DRILLING MUD MOTOR CLUTCH

(71) Applicant: ConocoPhillips Company, Houston, TX (US)

(72) Inventor: Hans-Jacob Lund, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 17/307,564

(22) Filed: May 4, 2021

(65) Prior Publication Data

US 2021/0340818 A1 Nov. 4, 2021

Related U.S. Application Data

(60) Provisional application No. 63/019,736, filed on May 4, 2020.

(51) Int. Cl.
*E21B 4/02* (2006.01)
*F16D 7/00* (2006.01)

(52) U.S. Cl.
CPC . *E21B 4/02* (2013.01); *F16D 7/00* (2013.01)

(58) Field of Classification Search
CPC ........................................................ E21B 4/02
See application file for complete search history.

(56) References Cited

U.S. PATENT DOCUMENTS

| | | | |
|---|---|---|---|
| 3,958,678 A * | 5/1976 | Jeter | F16C 29/0685 |
| | | | 192/45.017 |
| 4,080,115 A * | 3/1978 | Sims | E21B 4/02 |
| | | | 475/159 |
| 9,790,741 B2 | 10/2017 | Gaikwad et al. | |
| 10,584,535 B1 | 3/2020 | Carpenter | |
| 2014/0041943 A1 | 2/2014 | Lanning et al. | |
| 2014/0338980 A1 | 11/2014 | Kirkhope | |
| 2015/0345221 A1 | 12/2015 | Gaikwad et al. | |
| 2015/0354280 A1 | 12/2015 | Downton et al. | |
| 2017/0356289 A1 | 12/2017 | Baudoin | |
| 2018/0252039 A1 | 9/2018 | Campbell | |
| 2019/0284922 A1 | 9/2019 | Smith | |
| 2019/0316444 A1 | 10/2019 | Entchev et al. | |
| 2020/0166088 A1 * | 5/2020 | Leonov | F16D 41/185 |

FOREIGN PATENT DOCUMENTS

NO   20073573 L   1/2008

OTHER PUBLICATIONS

International Search Report and Written Opinion for PCT/US2021/030631 dated Aug. 2, 2021 (8 pages).

* cited by examiner

*Primary Examiner* — Giovanna Wright
(74) *Attorney, Agent, or Firm* — Polsinelli PC

(57) ABSTRACT

A drill string system includes a drill bit disposed at a distal end of a drill string. A clutch is coupled with the drill bit. A mud motor is coupled to the clutch, and the mud motor is operable to receive a drilling fluid therein and transfer torque to the drill bit through the clutch. The clutch disengages upon application of a torque exceeding a predetermined threshold.

18 Claims, 2 Drawing Sheets

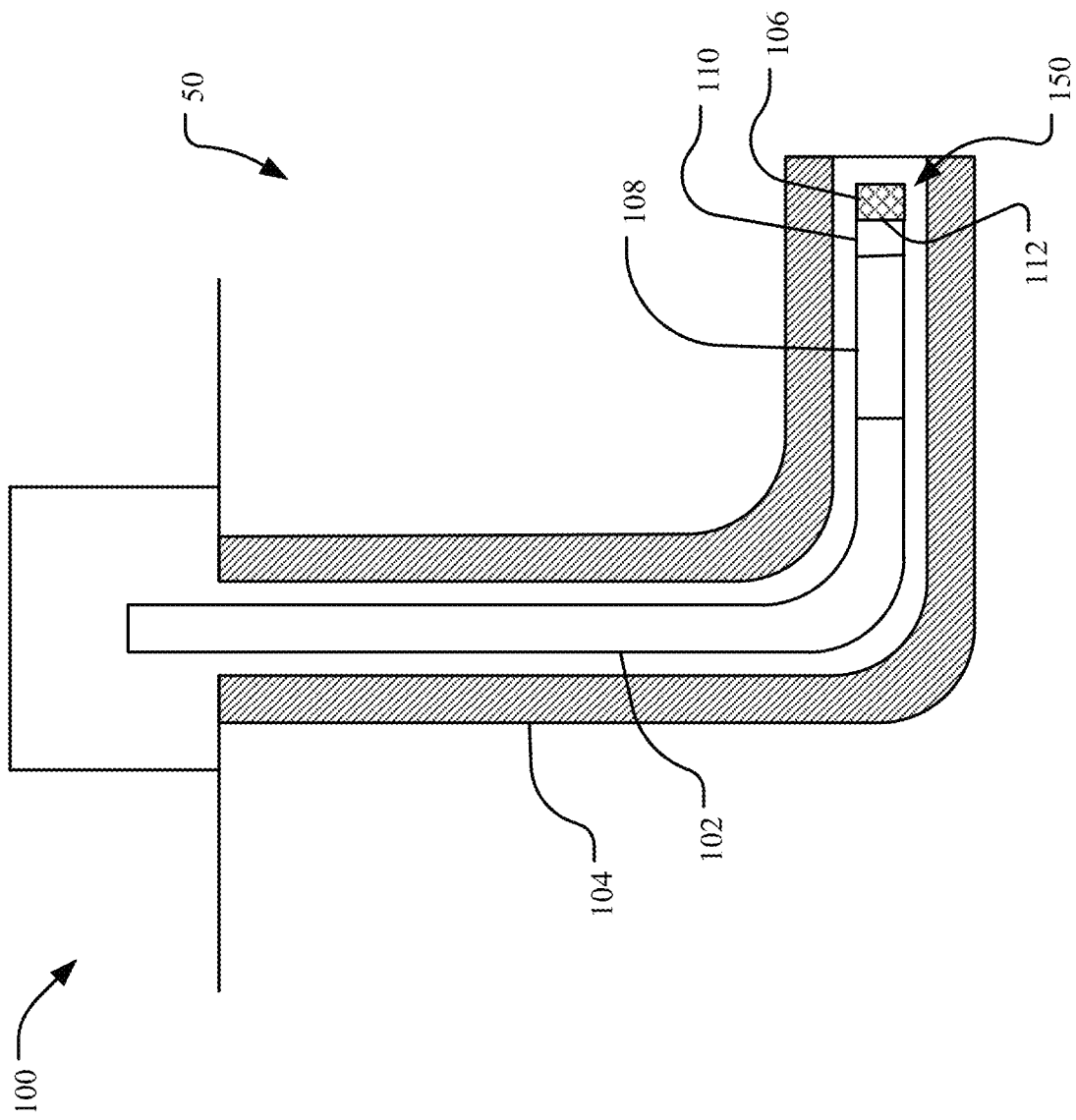

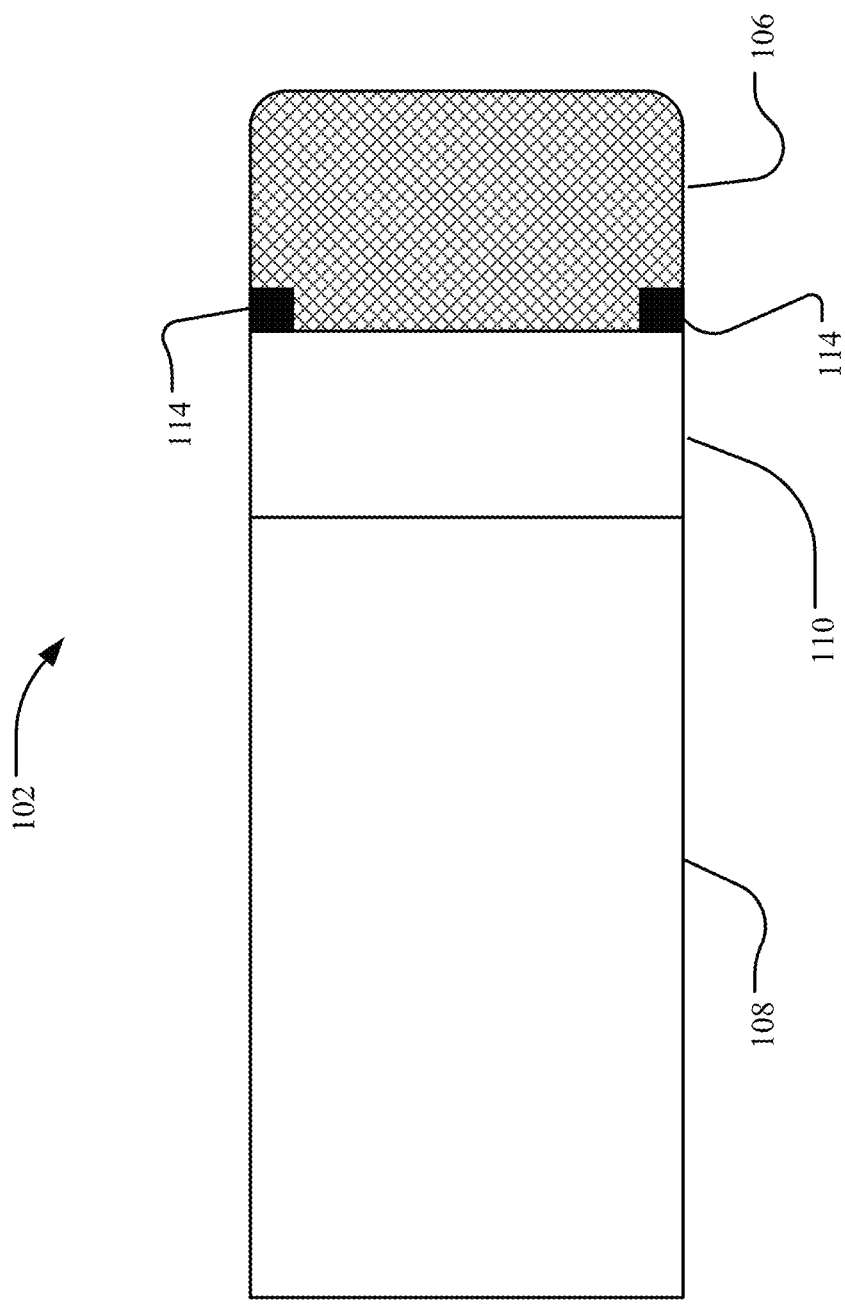

DRILLING MUD MOTOR CLUTCH

CROSS-REFERENCE TO RELATED APPLICATIONS

The present application claims priority to U.S. Provisional Application No. 63/019,736, entitled "Drilling Mud Motor Clutch" and filed on May 4, 2020, which is specifically incorporated by reference in its entirety herein.

BACKGROUND

1. Field

Aspects of the presently disclosed technology relate generally to systems and methods for drilling within a subterranean formation and more particularly to a drilling mud motor clutch.

2. Description of Related Art

Drilling fluid is circulated through a wellbore during drilling within certain subterranean formations. A mud motor can generate torque from the circulation of drilling fluid. However, vibrations and shocks experienced by the drill string during a drilling operation can damage and/or cause failure of a mud motor. The vibrations and shocks can further damage the drill string drive shaft potentially causing failure and/or separation of the drill bit from the drill string. It is with these observations in mind, among others, that various aspects of the present disclosure were conceived and developed.

SUMMARY

Implementations described and claimed herein address the foregoing problems by providing systems and methods for drilling within a subterranean formation. In one implementation, a drill string system includes a drill bit disposed at a distal end of a drill string. A clutch is coupled with the drill bit. A mud motor is coupled to the clutch, and the mud motor is operable to receive a drilling fluid therein and transfer torque to the drill bit through the clutch. The clutch disengages upon application of a torque exceeding a predetermined threshold.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

The foregoing summary, as well as the following detailed description, will be better understood when read in conjunction with the appended drawings. For the purpose of illustration, there is shown in the drawing certain implementations of the presently disclosed technology. It should be understood, however, that the presently disclosed technology is not limited to the precise implementations and features shown. The accompanying drawings, which is incorporated in and constitutes a part of this specification, illustrates implementations of apparatuses consistent with the presently disclosed technology, and, together with the description, serves to explain advantages and principles consistent with the presently disclosed technology, in which:

FIG. 1 is an environmental view of an example wellbore operation within a subterranean formation; and FIG. 2 is a diagrammatic view of an example drill string having a mud motor clutch.

DETAILED DESCRIPTION

The present disclosure involves systems and methods for drilling in a subterranean formation. In one example, a clutch is incorporated between a mud motor power section and a drill bit. The drill bit may be disposed at a distal end of a drill string, with the clutch coupled with the drill bit. The mud motor is coupled to the clutch and operable to receive a drilling fluid therein and generate torque to the drill bit through the clutch. The clutch disengages upon application of a torque exceeding a predetermined threshold. The clutch can be bi-directional, and the predetermined threshold may include a first predetermined threshold in a first rotational direction and a second predetermined threshold in a second rotational direction. The first predetermined threshold is a max torque for the mud motor, and the second predetermined threshold is any torque exceeding zero (N*m). The predetermined threshold can be adjustable. A rotor catch can operable couple the drill bit and the clutch, and the rotor catch is operable to maintain a coupling between the drill bit and the clutch in the event of clutch failure.

A mud motor assembly can include a mud motor having a rotor rotationally received within a stator, and a clutch operably coupled with the mud motor and operable to be coupled with a drill bit. The clutch operably disengages upon application of a torque exceeding a predetermined threshold. The mud motor can be operable to receive a drilling fluid therein, with the drilling fluid operable to induce rotation of the rotor relative to the stator. The mud motor can be a progressive cavity positive displacement pump operable to receive a drilling fluid therein. The stator can have a plurality of lobes operable to rotationally receive a corresponding lobe on the rotor during rotation of the rotor within the stator.

A drill string may be disposed in a wellbore within a subterranean environment. In one example, the drill string has a drill bit, a clutch, and a mud motor. The clutch is operable to transfer rotational power from the mud motor to the drill bit, and the drill bit is engaged with at least a portion of the subterranean formation. A drilling fluid is received in the mud motor, and a torque is generated in the mud motor. The torque is transferred from the mud motor to the drill bit. The clutch is disengaged if the torque on the mud motor exceeds a predetermined threshold. The clutch may be reengaged if the toque reduces below the predetermined threshold.

Generally, the clutch may be located in relation to different parts of a direction drilling rig bottom hole assembly (BHA), which uses a displacement or mud motor. A mud motor is generally a screw-type motor utilizing an incoming fluid to rotate at approximately 100-330 RPM, for example. The BHA may be bent at some point, for example by approximately two degrees. When drilling straight, the entire BHA may be rotated (e.g., at about 100-200 RPM). The mud motor also turns (e.g., at about 100-300 RPM), and the drill bit itself may rotate with both rotations (e.g., turning approximately 100-500 RPM). Where a bent section is rotating, the overall direction may be predominately straight. In one example, during directional drilling, the drill string strops rotating and the drill bit is only rotated by the mud motor (e.g., 100-300 RPM), which refers to slide drilling.

In some cases, a sub may be used to insert a bend angle, and in some cases dual bend angles in opposite directions may be used for straight drilling and aligned toward a turn for directional drilling. The mud motor rotates, creating an off-centered rotation or wobbly drive. The flex shaft takes the off-centered rotation of the mud motor and creates a concentric drive for the rest of the drive shaft. Universal joints may be placed between sections of the drive shaft to allow flex and bending. Bearings may be placed above or below the bend to transfer weight from the drive to the drill string.

The clutch may be positioned directly above the drill bit, for example using a clutch sub that is threaded to fit in the drive and receive the drill bit. In another example, the clutch may be positioned at the end of the drive shaft. The clutch may allow the remaining drive shaft, bearings, universal joints, and flex shaft to be made of a lower grade metal, while enabling a drilling with a higher RPM without damaging the bit or shaft. In another example, the clutch may be incorporated anywhere after the mud motor, including, without limitation being incorporated into the bearing assembly, at a bend, at a universal join, before the flex shaft, after the flex shaft, and/or the like.

I. Terminology

As used herein, the term "motor," "mud motor," "drilling motor," and the like refers to a device that converts hydraulic, electrical, or other energy into mechanical energy or imparts motion. In the case of a mud motor, the device converts hydraulic pressure into rotational motion. The mud motor may be a progressive cavity positive displacement pump (PCPD) motor, turbine, or other motor.

As used herein, the term "clutch," refers to a coupling used to connect and disconnect a driving and a driven part of a mechanism, especially a coupling that permits the former part to engage the latter gradually and without shock. In the oil field, a clutch permits gradual engaging and/or disengaging of the equipment driven by a motor. In one implementation, an overrun clutch may be used to mechanically separate the driveshaft from the driven shaft when the driveshaft behaves in a certain way. The overrunning clutch operates when the driveshaft or input rotates slower than the driven shaft or output. It also disengages when the driveshaft completely stops. In another implementation, an overload clutch, torque clutch, or guard clutch quickly disengages the drive system in overload or jam conditions. The clutch then re-engages when torque is reduced or under specific conditions dependent upon the clutch design and specifications.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the presently disclosed technology.

II. General Architecture

The present disclosure is drawn to a clutch operable to be implemented with a mud motor in a downhole environment. The mud motor can be operably arranged within at least a portion of a bottom hole assembly (BHA) and/or a drill string for formation of a wellbore through at least a portion of a subterranean environment. The mud motor can be operated by circulating a drilling fluid through the wellbore and/or transfer power from the mud motor to the drill bit, thereby increasing the rate of penetration (ROP) of the drill string the subterranean formation. The drill string can have a clutch disposed between the mud motor and the drill bit to prevent stalling of the mud motor in the event a torque exceeding a predetermined threshold.

FIG. 1 illustrates a diagrammatic view of a drilling operation through a subterranean formation, according to at least one instance of the present disclosure. The drilling operation 10 can include a drilling rig 100 having a drill string 102 operably forming a wellbore 104 through at least a portion of a subterranean formation 50. A bottom hole assembly (BHA) 150 can be disposed at a downhole distal end 116 of the drill string 102. The BHA 150 can include a drill bit 106 and a mud motor 108. The drill bit 106 can be operably arranged to rotational engage a portion of the subterranean formation 50, thereby operably forming the wellbore 104 therethrough. The mud motor 108 can be arranged uphole of the drill bit 106 and is operable to generate power via the flow of a drilling fluid (e.g. drilling mud). In some instances, the mud motor 108 and the drill bit 106 can be in fluidic communication allowing the drilling fluid to be expelled through one or more openings in the drill bit 106 to circulate formation cuttings away from the drill bit 106 and/or provide lubrication between the drill bit 106 and the subterranean formation 50.

In some instances, the BHA 150 can have a slight deviation (e.g. 1°, 2°, 3°) along its longitudinal length. In operation, the drill string 102 and/or the mud motor 108 can be rotated to provide energy transfer to the drill bit 106, thereby assisting in the formation of the wellbore 104 in the subterranean formation. Due to rotation of the slight deviation, the drill string 102 produces a substantially straight wellbore 104 when the drill string rotates. During directional drilling, the drill string rotation is stopped with the deviated section directed in the direction of borehole deviation and the mud motor become the primary rotational force. This drives the borehole in the direction of the deviation until the well bore reaches the desired directional drilling. In some instances, the well bore is horizontal with respect to the formation allowing a horizontal well to access the length of the formation.

In some instances, the BHA 150 can have a slight deviation from longitudinal (e.g. 2°) along its longitudinal length. In operation, the drill string 102 and/or the mud motor 108 can be rotated to provide energy transfer to the drill bit 106, thereby assisting in the formation of the wellbore 104 in the subterranean formation. Due to rotation of the slight deviation, the drill string 102 produces a substantially straight wellbore 104. In other instances, the BHA 150 can have two deviations from longitudinal in which the two deviations are arranged in opposite directions to produce straight wellbore 104, and the deviations can be aligned in the same direction to form the wellbore 104 in toward the deviation in directional drilling.

As the drilling fluid is pumped through the mud motor 108, the mud motor 108 can convert hydraulic horsepower from the flow of the drilling fluid to torque and/or bit speed to the drill bit 106. The power transferred to the drill bit 106 by the by mud motor 108 can increase the efficiency of the drilling operation 100 and increase the ROP of the drill string 102 through the subterranean formation 50. The mud motor 108 can have a flex shaft disposed between the mud motor 108 and a drive shaft 112 coupled with the drill bit 106. One or more universal joints can be implemented along the drive shaft 112 to allow flex and/or bending between sections of the drive shaft 112. One or more bearing assemblies can also be disposed above and/or below the bend to assist in weight transfer from the drive to the drill string 102.

The BHA assembly 150 can include one or more flex shafts and/or universal joints arranged between the mud motor 108 and/or the drill bit. The one or more flex shafts and/or universal joints can be operable to receive the substantially concentric power and create true concentric rotation to the drill bit 106. In some instances, specifically instances directionally drilling, the mud motor can be operated at a predetermined speed while the drill string 102 is maintained substantially stationary.

A clutch 110 can be operably arranged between and adjacent to the drill bit 106 and the mud motor 108 at the distal end 150 of the drill string 102. The clutch 110 can be coupled with the driveshaft and/or the drill bit 106. In one implementation, the clutch is attached directly to the motor drive shaft, protecting the drive shaft, joints and drill bit from motor torque. In another implementation, the clutch may be attached directly to the drill bit, protecting the drive shaft and mud motor from jarring by the drill bit.

The drill string 102 can be operably arranged to form a wellbore 104 through at least a portion of the subterranean formation 50 through rotation of the drill bit 106. Rotation of the drill string 102 and/or the drill bit 106 can engage the drill bit 106 with the subterranean formation 50, thereby grinding and/or eroding the subterranean formation 50 and forming the wellbore 104 therethrough. A drilling fluid can be circulated through the wellbore 104 to remove the drill cuttings (e.g. fragments of the subterranean formation 50) formed by the erosive engagement between the drill bit 106 and the subterranean formation 50.

FIG. 2 illustrates a detailed isometric view of a distal end of a drill string, according to at least one instance of the present disclosure. The mud motor 108 can be operably arranged to receive a portion of the drilling fluid therethrough. The flow of the drilling fluid through the mud motor 108 can generate a rotation motion along the drive shaft 112 coupling the mud motor 108 and the drill bit 106. The mud motor 108 can be operably arranged to transfer the rotational energy generated by the flow of the drilling fluid to the drill bit 106, thereby increasing the rate of penetration (ROP) of the drill string 102.

As the drill bit 106 engages the subterranean formation 50, various shocks, vibrations, and/or motions can be felt along the drill bit, the mud motor, and/or the drill string 102. The clutch 110 can be operably arranged between the mud motor 108 and the drill bit 106 to protect the mud motor 108 from damage in the event of a torque spike along the drive shaft 112 from drill bit 106. In at least one instance, the clutch 110 can be threadingly engaged with the driveshaft 112 and operable to receiver the drill bit 106 therein. In other instances, the clutch 110 can be disposed at any location on the drill string 102 downhole of the mud motor 108.

The drill string 102 can experience a torque spike and/or other shock event in instances where the drill bit 106 over engages the subterranean formation 50, thereby generating a drill bit stall. A drill bit stall occurs with the torque supplied by the drill string 102 and/or the mud motor 108 is not sufficient to keep rotating the drill bit.

A mud motor 108 arranged along a drill string 106 can be optimized to withstand the desired drive torque to be generated by the drilling fluid passing therethrough, but also any drill bit stalls, torque spikes, and/or other shock events occurring during a drilling operation. Therefore, mud motors are frequently operated at far below their optimal torque output to provide a threshold to absorb torque spikes. This excessive operating threshold in the mud motor 108 results in inefficiency as the mud motor 108 cannot be operated at its peak design parameters to prevent potential damage during a torque spike. The clutch 110 can provide a buffer between the drill bit 106 and the mud motor 108, thereby allowing the mud motor 108 to be operated at an optimal toque output without the need for an excessive operating threshold. Further, the clutch 110 can allow any elements disposed between the mud motor 108 and the clutch 110 including, but not limited to, drive shaft sections, bearings, universal joints, and/or flex shafts to be made of lower grade materials as they no longer require a threshold to absorb potential torque spikes.

The clutch 110 can prevent damage to the mud motor 108 in the event of the torque spike and/or other shock even by allowing the mud motor 108 to "slip" if the torque experienced from the mud motor 108 by the clutch exceeds a predetermined threshold. The clutch 110 allowing the mud motor 108 to "slip" can allow the mud motor to continue rotational movement a substantially continuous RPM despite the drill bit 106 stall or other shock event, thereby preventing damage to the mud motor 108.

The clutch 110 can allow the mud motor 108 to be operated much closer to the peak torque and/or RPM output because the clutch 110 can disengage and/or allow the mud motor 108 to "slip" in the event of the torque spike event. The disengagement between the drill bit 106 and the clutch 110 can prevent damage to the mud motor 108 during the torque spike. In at least one instance, the clutch 110 can re-engage upon the torque falling below the predetermined threshold.

In some instances, the clutch 110 can be a bi-directional clutch having a first predetermined threshold in a first rotational direction (e.g. clockwise) and a second predetermined threshold in a second rotational direction (e.g. counter-clockwise). The clutch 110 can thus be operable to disengage (e.g. "slip") if the drill bit 106 experiences a torque event above the first predetermined threshold in the drilling rotational direction (e.g. clockwise), but also allow the clutch 110 to disengage if the drill bit 106 begins to rotate in a reverse direction. In at least one instance, the first predetermined threshold can be operably arranged for the maximum desired operating torque output by the mud motor 108, while the second predetermined threshold can be a minimal torque threshold. The second predetermined threshold can thus disengage the clutch upon the application of any measurable torque in a rotational direction opposite of the first predetermined threshold. In at least one instance, the second predetermined threshold is any torque greater than zero (Newton-meter). The clutch 110 can re-engage upon the torque falling below either the first predetermined threshold and/or the second predetermined threshold.

The clutch 110 can have an adjustable and/or user-defined first predetermined threshold and/or second predetermined threshold. In at least one instance, an operator can select the first predetermined threshold and second predetermined threshold of the clutch 110 based on the drill bit 106 and/or the mud motor 108 being implemented in a particular drilling operation. In some instances, the second predetermined threshold is not user-adjustable.

The clutch 110 can have a rotor catch engagement 114 with the drill bit 106. The rotor catch engagement 114 can be operably arranged to maintain engagement between the clutch 110 and/or the drill bit 106 in the event the clutch 110 breaks in a downhole environment. The rotor catch engagement 114 can be operably arranged to allow the drill string 102 to be pulled-out-of-hole (POOH) in the event of damage to the drill bit 106, mud motor 108, and/or clutch 110 without risking leaving the drill bit 106 downhole, and thereby requiring an expensive and/or time consuming operation. In at least one instance, the rotor catch engagement 114 can be a tongue and groove arrangement disposed around an inner surface of the drill bit 106 and an outer surface of the clutch 110, thereby allowing free rotation of the drill bit 106 relative to the clutch during operation, but preventing disengagement between the drill bit 106 and the clutch.

It is understood that the specific order or hierarchy of steps in the methods disclosed are instances of example approaches and can be rearranged while remaining within the disclosed subject matter. The accompanying method claims thus present elements of the various steps in a sample order, and are not necessarily meant to be limited to the specific order or hierarchy presented.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A drill string system comprising:
    a drill bit disposed at a distal end of a drill string;
    a clutch coupled with the drill bit;
    a mud motor coupled to the clutch, the mud motor operable to receive a drilling fluid therein and transfer torque to the drill bit through the clutch, wherein the clutch disengages upon application of a torque exceeding a predetermined threshold; and
    a rotor catch operably coupling the drill bit and the clutch, the rotor catch operable to maintain a coupling between the drill bit and the clutch in event of clutch failure of the clutch.

2. The system of claim 1, wherein the clutch is bi-directional, the predetermined threshold including a first predetermined threshold in a first rotational direction and a second predetermined threshold in a second rotational direction.

3. The system of claim 2, wherein the first predetermined threshold is a maximum desired operating torque for the mud motor, and the second predetermined threshold is any torque exceeding zero (N*m).

4. The system of claim 1, wherein the predetermined threshold is adjustable.

5. The system of claim 1, wherein the mud motor is a progressive cavity positive displacement pump operable to receive the drilling fluid therein.

6. The system of claim 1, wherein the mud motor has a rotor and a stator, the rotor operable to rotational engage at least a portion of the stator.

7. The system of claim 6, wherein the stator has a plurality of lobes operable to rotationally receive a corresponding lobe on the rotor during rotation of the rotor within the stator.

8. A mud motor assembly comprising:
    a mud motor;
    a clutch operably coupled with the mud motor and operable to be coupled with a drill bit, wherein the clutch operably disengages upon application of a torque exceeding a predetermined threshold; and
    a rotor catch operable to couple the clutch with the drill bit and the clutch, the rotor catch operable to maintain a coupling between the drill bit and the clutch in event of clutch failure of the clutch.

9. The assembly of claim 8, wherein the clutch is bi-directional, the predetermined threshold including a first predetermined threshold in a first rotational direction and a second predetermined threshold in a second rotational direction.

10. The assembly of claim 9, wherein the first predetermined threshold is a maximum desired operating torque for the mud motor, and the second predetermined threshold is any torque exceeding zero (N*m).

11. The assembly of claim 8, wherein the predetermined threshold is adjustable.

12. The assembly of claim 8, wherein the mud motor is operable to receive a drilling fluid therein, the drilling fluid operable to induce rotation of a rotor relative to a stator.

13. The assembly of claim 12, wherein the stator has a plurality of lobes operable to rotationally receive a corresponding lobe on the rotor during rotation of the rotor within the stator.

14. The assembly of claim 8, wherein the mud motor is a progressive cavity positive displacement pump operable to receive a drilling fluid therein.

15. A method comprising:
disposing a drill string in a wellbore within a subterranean environment, the drill string having a drill bit, a clutch, a mud motor, and a rotor catch;
engaging the drill bit with at least a portion of the subterranean formation;
receiving a drilling fluid in the mud motor;
generating a torque in the mud motor;
transferring the torque from the mud motor to the drill bit using the clutch; and
disengaging the clutch if the torque on the mud motor exceeds a predetermined threshold; and
maintaining a coupling between the drill bit and the clutch using the rotor catch in event of clutch failure of the clutch.

16. The method of claim 15, further comprising:
reengaging the clutch if the torque reduces below the predetermined threshold.

17. The method of claim 15, wherein the clutch is bi-directional, the predetermined threshold including a first predetermined threshold in a first rotational direction and a second predetermined threshold in a second rotational direction.

18. The method of claim 17, wherein the first predetermined threshold is a maximum desired operating torque for the mud motor, and the second predetermined threshold is any torque exceeding zero (N*m).

* * * * *